United States Patent [19]

Marazzi

[11] 4,361,380
[45] Nov. 30, 1982

[54] OPTICAL FIBER COUPLING MEANS HAVING SPIRAL AIR VENT PASSAGE

[75] Inventor: Silvio Marazzi, Cavigliano, Switzerland

[73] Assignee: Diamond SA, Losone, Switzerland

[21] Appl. No.: 177,882

[22] Filed: Aug. 14, 1980

[30] Foreign Application Priority Data

Aug. 15, 1979 [CH] Switzerland .................. 7466/79

[51] Int. Cl.³ .............................................. G02B 5/14
[52] U.S. Cl. ................................ 350/96.21; 285/13; 285/DIG. 25
[58] Field of Search ............... 350/96.21; 285/13, 14, 285/417, DIG. 25; 138/26; 156/87

[56] References Cited

U.S. PATENT DOCUMENTS

| | | | |
|---|---|---|---|
| 4,026,633 | 5/1977 | Crick | 350/96.21 |
| 4,142,084 | 2/1979 | Torrani | 285/13 X |
| 4,261,644 | 4/1981 | Giannaris | 350/96.21 |

*Primary Examiner*—Paul L. Gensler
*Attorney, Agent, or Firm*—William R. Hinds

[57] ABSTRACT

A light-conductor coupling means for coaxially connecting two optical fibres comprises two cylindrical end members, which contain the optical fibres, and a centering sleeve which receives and centers the end members with a precise fit. The centering sleeve, at its inner surface, and/or the cylindrical end members at their outer surfaces are provided with at least one spiral vent passage. The vent passage permits the air to escape when the two cylindrical end members are fitted together. The vent passage extends over the entire periphery of the inner surface so that the centricity of the arrangement is not detrimentally affected. In order to permit the cylindrical end members to be pushed together with a rapid movement, hollow cavities in the form of annular grooves in which the escaping air is temporarily compressed are also provided.

10 Claims, 4 Drawing Figures

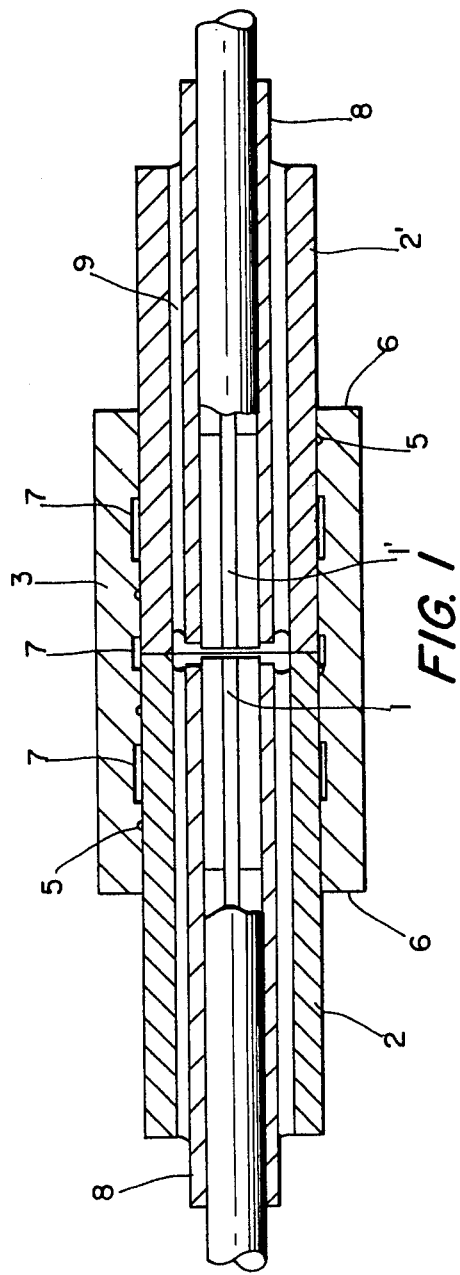
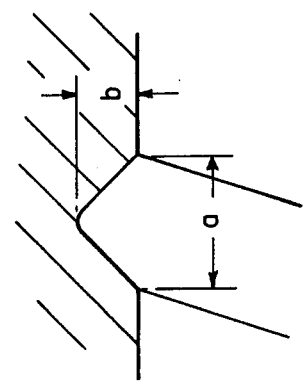
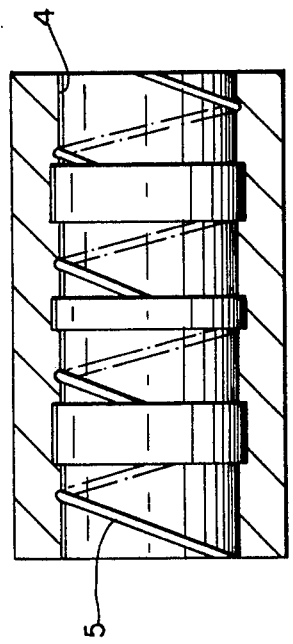

OPTICAL FIBER COUPLING MEANS HAVING SPIRAL AIR VENT PASSAGE

FIELD OF THE INVENTION

This invention is concerned with coupling means for coaxially connecting two conducting fibres (hereinafter referred to as optical fibres) comprising two cylindrical end members containing the optical fibres and a centering sleeve receiving and centering the end members with a precise fit.

BACKGROUND OF THE INVENTION

Optical fibres of this kind have already been used, for a considerable period of time, instead of electrical conductors, for data transmission. The object of the light-conductor coupling means is to transmit the signals from one optical fibre to another, with minimum loss. For this purpose, it is necessary for the glass fibres to be brought as close together as possible, concenntrically and coaxially. Even the slightest relative displacement between the two optical axes results in considerable losses. The light-conductor coupling means must also protect the glass fibre connection from environmental influences such as humidity, dust, vibration and the like.

Light-conductor coupling means are already known, wherein the two optical fibres, which are each mounted in a respective end member, are held together by means of a cylindrical metal sleeve. A coupling means of this kind is described for example in German DAS No 23 52 874. In Order to ensure that the two optical fibres are centered absolutely without play in the centering sleeve, the end members and the centering sleeve must be machined to extremely fine tolerances. However, this means that when the two end members are pushed together in the centering sleeve, the air which is enclosed therein finds it virtually impossible to escape. This results in the formation between the two end members of a resilient air cushion which, in extreme cases, prevents the two optical fibres from lying against each other. Boring holes in the casing of the centering sleeve is not a practical solution, as dust and dirt could penetrate through such openings to the light fibres. In addition, bores of this kind give rise to fine accumulations which can no longer be removed from the interior of the centering sleeve and which can be the cause of the optical axes of the optical fibres suffering from slight displacement.

SUMMARY OF THE INVENTION

An object of the present invention is to provide a light-conductor coupling means which ensures in the optimum manner that air can escape from the centering sleeve when the fibres are coupled together, without the possibility of fouling occurring or centricity being detrimentally affected.

The present invention provides a light-conductor coupling means for coaxially connecting two optical fibres comprising two cylindrical end members each containing an optical fibre, a centering sleeve receiving and centering the end members with a precise fit and at least one spiral vent passage between the outer surfaces of the cylindrical end members.

The spiral vent passage may be formed on the inner surface of the centering sleeve and/or on the outer surfaces of the cylindrical end members.

Because of the spiral arrangement of the vent passage in the interior of the centering sleeve, there is no possibility of the centricity being detrimentally affected by the machining of the sleeve, as the passage does not extend parallel to the center line of the sleeve but winds at a given angle about the above-mentioned center line. It will be seen therefore that the entire periphery of an end member comes into contact with a vent passage or the marginal region thereof, at some position. This means that any displaced portions of material in the marginal region of the vent passage, which could of course give rise to defects, also extend over the entire periphery of an end member.

So that air can escape in both directions, the spiral vent passage advantageously extends between the ends of the centering sleeve over the entire length of the inner surface. In a particularly advantageous embodiment, the spiral vent passage opens in the region of the inner surface of the centering sleeve to at least one hollow cavity between an end member and the inner surface. Because of the small dimensions of the vent passage, with the normal pressing force used in assembling the coupling means the air requires a certain amount of time to escape. The venting time is considerably reduced by the hollow cavity which acts as an expansion chamber into which a part of the air which is to be pressed out is displaced. Excess pressure in the cavity does not cause any kind of undesirable force in the axial direction.

The hollow cavities may be formed in a particularly simple manner as annular grooves at the inner surface of the centering sleeve. For production process reasons, the vent passage is advantageously of an approximately V-shaped cross-sectional configuration.

In order to produce the components with optimum precision which will remain unchanged even after some years, the centering sleeve is advantageously made from a sintered material or a monocrystalline material. These materials are hard, wear-resistant and chemically inert and also have low coefficients of heat expansion. It has been found in particular that the use of materials with a Mohs' hardness of 8.5 or higher results in optimum connections being made.

BRIEF DESCRIPTION OF THE DRAWINGS

In the accompanying drawings,

FIG. 1 is a cross-section through one form of a light-conductor coupling means according to the invention;

FIG. 2 is a cross-section of centering sleeve with a spiral vent passage;

FIG. 3 is a cross-section through a vent passage on a greatly enlarged scale.

DESCRIPTION OF A PREFERRED EMBODIMENT

Figure 4:
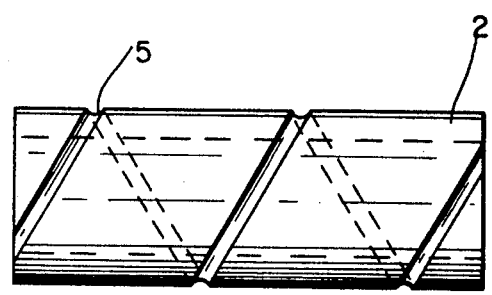
FIG. 4 is a cross-section of a cylindrical end member with a vent passage in its outer surface.

Referring to FIG. 1, two light fibres 1 and 1' are embedded in tube portions 8 and are fixed in position by means of a hardened layer 9 of adhesive. The tube portions are in turn passed through cylindrical end members 2 and 2' which come into contact with each other at their end faces.

The end members 2 and 2' are centered relatively to each other by a centering sleeve 3 which protects the connection between the light fibres 1 and 1' from external influences. The inner surface of the centering sleeve 3 and the outer surfaces of the cylindrical end members 2 are precisely fitted together, with very high-precision machining to a thousandth part of an inch. Air enclosed in the centering sleeve when the two end members 2 and 2' are pushed together would find it virtually impossible to escape to the exterior without venting, as will be appreciated. The inner surface 4 (see FIG. 2) of the centering sleeve 3 is therefore provided with a spiral vent passage 5 which extends over the entire length of the centering sleeve. As shown in FIG. 3, the vent passage is advantageously of an approximately V-shaped cross-sectional configuration with a width a and depth b. The width a may be, for example, 0.4 mm, while the depth may be 0.2 mm.

So that the two cylindrical end members 2 and 2' can be brought together more quickly and so that the air can escape more rapidly, hollow cavities 7 in the form of annular grooves are provided in the inner surface 4 of the connecting sleeve (see FIG. 2). The spiral vent passage 5 opens into the cavities 7. The cavities 7 serve as expansion chambers for rapidly accommodating air which can subsequently escape slowly by way of the vent passages which lead towards the ends 6. It will be seen that it is virtually impossible for dirt to reach the joint between the two light fibres, by way of the spiral vent passage 5. The spiral winding configuration of the vent passage 5 reliably ensures that the centricity of the arrangement is not affected.

As shown in FIG. 4, the spiral vent passage 5 may also be arranged at the outer surface of the cylindrical end members 2. In certain cases, the cavities 7 can also be arranged on the end members 2.

The centering sleeve 3 is made from a sintered material or from a monocrystalline material such as, for example, silicon nitride, boron nitride, oxide ceramic, corundum, sapphire or ruby. These materials can be machined with an extraordinary degree of precision and fineness and also ensure optimum resistance to chemical, thermal and mechanical influences.

It will be appreciated that modifications may be made in the preferred form described without thereby departing from the subject matter of the invention. It is possible for example for the inner surface 4 to have a plurality of vent passages 5, in the manner of a multiple screw thread. In addition, the cross-sectional shape of the vent passage and the arrangement and configuration of the hollow cavities can be modified as required.

I claim:

1. A light conductor coupling means for coaxially connecting two optical fibres comprising two cylindrical end members each containing an optical fibre, a centering sleeve receiving and centering the end members with a precise fit and at least one spiral vent passage between the inner surface of the centering sleeve and the outer surfaces of the cylindrical end members.

2. A light-conductor coupling means as defined in claim 1, having a spiral vent passage formed on the inner surface of the centering sleeve.

3. A light-conductor coupling means as defined in claim 1, having a spiral vent passage formed on the outer surface of the cylindrical end members.

4. A light-conductor coupling means as defined in claim 1, wherein the spiral vent passage extends between the ends of the centering sleeve over the entire length of its inner surface.

5. A light-conductor coupling means as defined in claim 1, wherein the spiral vent passage opens, in the region of the inner surface of the centering sleeve, between an end member and the inner surface into at least one hollow cavity.

6. A light-conductor coupling means as defined in claim 5 wherein a plurality of hollow cavities in the form of annular grooves are provided in the inner surface of the centering sleeve.

7. A light-conductor coupling means as defined in claim 1, wherein the vent passage is approximately V-shaped in cross-section.

8. A light-conductor coupling means as defined in claim 1, wherein the centering sleeve is of sintered material.

9. A light-conductor coupling means as defined in claim 1, wherein the centering sleeve is of a monocrystalline material.

10. A light conductor coupling means as defined in claim 1, wherein the centering sleeve and the end members comprise a material with a Mohs' hardness of at least 8.5, at least at the surfaces which are in engagement with each other.

* * * * *